United States Patent
Tamme

(10) Patent No.: US 12,233,811 B2
(45) Date of Patent: Feb. 25, 2025

(54) KNEE AIRBAG MODULE

(71) Applicants: ZF AUTOMOTIVE GERMANY GMBH, Alfdorf (DE); AUDI AG, Ingolstadt (DE)

(72) Inventor: Sven Tamme, Alfdorf (DE)

(73) Assignees: ZF AUTOMOTIVE GERMANY GMBH, Alfdorf (DE); AUDI AG, Ingolstadt (DE)

( * ) Notice: Subject to any disclaimer, the term of this patent is extended or adjusted under 35 U.S.C. 154(b) by 0 days.

(21) Appl. No.: 17/423,258

(22) PCT Filed: Jan. 17, 2020

(86) PCT No.: PCT/EP2020/051108
§ 371 (c)(1),
(2) Date: Jul. 15, 2021

(87) PCT Pub. No.: WO2020/148419
PCT Pub. Date: Jul. 23, 2020

(65) Prior Publication Data
US 2022/0073028 A1    Mar. 10, 2022

(30) Foreign Application Priority Data
Jan. 18, 2019 (DE) .................. 10 2019 101 284.8

(51) Int. Cl.
*B60R 21/239* (2006.01)
*B60R 21/231* (2011.01)
(Continued)

(52) U.S. Cl.
CPC .......... *B60R 21/239* (2013.01); *B60R 21/233* (2013.01); *B60R 2021/23169* (2013.01);
(Continued)

(58) Field of Classification Search
CPC ........ B60R 21/233; B60R 2021/23324; B60R 2021/2395; B60R 21/239; B60R 21/16;
(Continued)

(56) References Cited

U.S. PATENT DOCUMENTS 5,845,935 A * 12/1998 Enders ................ B60R 21/2338
280/730.2
7,661,700 B2 * 2/2010 Imamura ............... B60R 21/203
280/743.2
(Continued)

FOREIGN PATENT DOCUMENTS

DE    202006005872 U1    6/2006
DE    102006044707 A1    6/2007
(Continued)

*Primary Examiner* — Paul N Dickson
*Assistant Examiner* — Matthew Joseph Ganci
(74) *Attorney, Agent, or Firm* — Tarolli, Sundheim, Covell & Tummino LLP

(57) ABSTRACT

A knee airbag module, comprising an airbag (10) which has plural vertical chambers superimposed in the inflated state, including a middle, upper and lower chamber (18, 20, 16), is filled directly via the middle chamber (18), wherein the lower chamber (16) can be fluid-communicated with the middle chamber via plural overflow openings (28) and a valve device is configured on the overflow openings (28) so that the overflow openings (28) are open at the beginning of the deployment operation and the valve device closes the overflow openings (28) in the course of the deployment operation.

18 Claims, 6 Drawing Sheets

Figure 1:
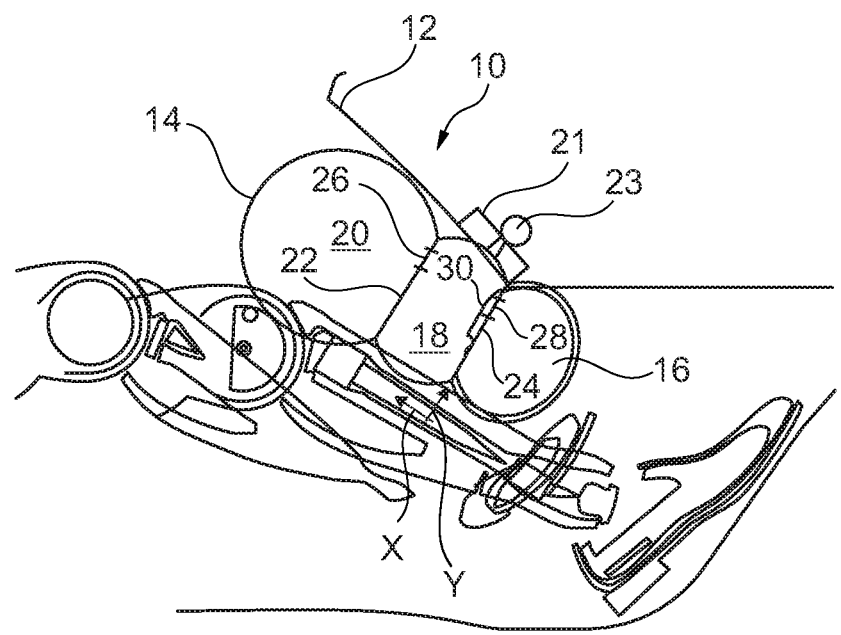

(51) Int. Cl.
*B60R 21/233* (2006.01)
*B60R 21/2338* (2011.01)

(52) U.S. Cl.
CPC ............... *B60R 2021/23324* (2013.01); *B60R 2021/23382* (2013.01); *B60R 2021/2395* (2013.01)

(58) Field of Classification Search
CPC ........... B60R 2021/23169; B60R 2021/23382; B60R 21/206; B60R 21/231
See application file for complete search history.

(56) References Cited

U.S. PATENT DOCUMENTS

| | | | |
|---|---|---|---|
| 9,758,124 B2* | 9/2017 | Kruse | B60R 21/013 |
| 2011/0175334 A1* | 7/2011 | Miller | B60R 21/239 |
| | | | 280/736 |
| 2011/0251039 A1 | 10/2011 | Hong et al. | |
| 2016/0068131 A1* | 3/2016 | Komatsu | B60R 21/233 |
| | | | 280/730.1 |
| 2017/0057447 A1 | 3/2017 | Ando | |
| 2018/0345899 A1* | 12/2018 | Munsee | B60R 21/239 |

FOREIGN PATENT DOCUMENTS

| | | |
|---|---|---|
| DE | 102008029655 A1 | 12/2009 |
| EP | 1508485 B1 | 7/2011 |
| EP | 2457782 A1 | 5/2012 |
| EP | 2617607 A1 | 7/2013 |
| JP | 2005075143 A | 3/2005 |
| JP | 20090137534 A | 6/2009 |

\* cited by examiner

KNEE AIRBAG MODULE

This is a U.S. National Stage patent application under 35 USC 371, claiming priority to International Application No. PCT/EP2020/051108, filed on 17 Jan. 2020; which claims priority from DE 10 2019 101 284.8, filed 18 Jan. 2019, the entireties of both of which are incorporated herein by reference.

The invention relates to a knee airbag module, comprising an airbag having plural vertically extending chambers superimposed in the inflated state.

Knee airbag modules are installed differently within the vehicle. In general, a distinction is made between a so-called module accommodated in the instrument panel (mid-mounted module) which includes an airbag that extends, in the deployed state, diagonally upward from the lower region of the instrument panel and a module disposed below and behind the instrument panel (low-mounted module) which is provided so-to-speak in the area of an upper limitation of the footwell. In this module, the airbag must first extend substantially horizontally or slightly diagonally upward and must then extend upward with a slight kink at the transition from the footwell to the instrument panel so that this part of the airbag is inflated between the instrument panel and the knees.

It is expected from the future piloted and/or autonomous driving that the occupants will shift the vehicle seat even farther backwards or will even more recline the seatback so that their legs protrude relatively strongly straightened into the footwell. This may possibly result in the lower extremities swaying forward and impact on the instrument panel or in the knee becoming overstretched.

The present invention attempts to decelerate the swaying movement and to prevent the knee from overstretching in a mid-mounted and a low-mounted module.

The mid-mounted knee airbag module according to the invention comprises an airbag having plural vertically extending chambers superimposed in the inflated state, with a middle chamber, an upper chamber and a lower chamber, wherein the middle chamber is directly coupled to the gas generator and is inflated first, wherein the lower chamber can be fluid-communicated with the middle chamber via plural overflow openings and includes a valve device provided at the overflow openings which is configured to constantly keep open the overflow openings at the beginning of the deployment operation and to close the overflow openings in the course of the deployment operation.

It is achieved by the valve device that the lower chamber is not inflated as fully as the middle chamber and the upper chamber, and therefore the pressure can be subdivided within the airbag. The final pressure and the filling time of the lower chamber can be adapted via the number and the size of the overflow openings. As was found, the load values of the knee, the tibia and the foot are reduced, because the lower extremities are prevented from swaying and overstretching. As, however, at the beginning also the lower chamber can be deployed very quickly, it is available for restraint at an early stage.

One variant of the invention provides the valve device to be configured so as to close the overflow openings not earlier than 20 ms to 40 ms after igniting the gas generator. The lower chamber is usually contacted later than 20 ms to 40 ms, in particular later than 40 ms, so that, in the case of contact, the lower pressure is already prevailing in the lower chamber as compared to the pressure present in the middle chamber.

The valve device may be a passive unit. Passive means that no actuator which can be activated electrically or in any other way via sensors is present. Rather, the valve device moves by a pure mechanical coupling to the airbag wall and, where necessary, to parts fixed in position such as parts of the airbag module or areas of the airbag wall which are not displaced. Here tension means such as tethers can be used.

As an alternative to this, of course also an electrically operable actuator can be provided via which the valve device is moved and which operates the valve device in response to a signal and changes the opening state of the overflow openings. Such actuator is particularly a pyrotechnical actuator.

The valve device may have a tension means that moves a closing means from reaching a predetermined deployment state via the overflow openings so as to close the latter. This means that the tension means couples non-displaceable portions to displaceable portions to cause a relative movement of the closing means.

The closing means is formed, for example, by at least one flexible wall that is fixed to the airbag wall, e.g., via a tear seam, and is detached from the fixation by the tension means. In this way, it is ensured that, on the one hand, the flexible closing means cannot get in front of the overflow openings under any circumstances at the beginning of the deployment operation, and, on the other hand, it is ensured that a certain force can only be exerted upon the closing means before the latter actually closes the overflow openings.

Plural overflow openings may be assigned to the flexible wall in order to close them. Thus, the number of the parts of the valve device is reduced.

Preferably, the flexible wall includes plural openings which are aligned with the overflow openings prior to activating the valve device. Subsequently, the flexible wall is moved so that the openings in the wall will no longer overlap the overflow openings and the overflow openings are closed.

The foregoing object is achieved in a low-mounted knee airbag module comprising an airbag with a lower chamber and an upper chamber which in the inflated state are superimposed and extend vertically. The lower chamber is directly coupled to the gas generator and is inflated first, wherein between the lower chamber and the legs of the occupant an additional chamber is provided which rests on and is filled via the lower chamber. Between the lower chamber and the additional chamber overflow openings are provided. The thickness of the airbag in the region of the additional chamber should be at least 20% above the maximum thickness of the upper chamber to reach an L shape when viewed from the side.

The fact that the additional chamber rests on the lower chamber and protrudes further toward the feet and the tibias of the occupant than the lower chamber alone, gives the airbag a kind of L-shape, and the additional chamber prevents straightening and overstretching, because it comes earlier into contact with the feet or the tibias than previous airbags of low-mounted modules. The occupant's legs can be caught by the additional chamber so that overstretching and impacting on the instrument panel is prevented or at least sufficiently dampened.

The thickness is measured in a side view, namely toward a plane on which the rear sides of the lower chamber and the upper chamber rest.

The overflow openings are preferably configured to be so small that they time-delay filling of the additional chamber.

Optionally, also in this case a valve device may be provided which either opens or closes the overflow openings in the course of the deployment operation.

In the fully inflated state, the additional chamber should not reach the internal pressure of the lower chamber, in particular the internal pressure of the additional chamber should be at least 30% to 40% below the maximum internal pressure of the middle chamber, when the airbag is completely inflated. The time at which the airbag is completely inflated is shown especially by the time at which the legs of the vehicle occupant impact on one of the chambers of the airbag, in particular on the additional chamber of the airbag.

The valve device may be configured to close the overflow openings at the beginning of the deployment operation and to open them in the course of the deployment operation. By this change of the state of the overflow openings, the lower chamber is intended to be inflated late.

In the low-mounted module according to the invention, too, a tether may be provided, of course, to open or close the overflow openings, namely passively or actor-operated.

Figure 2:
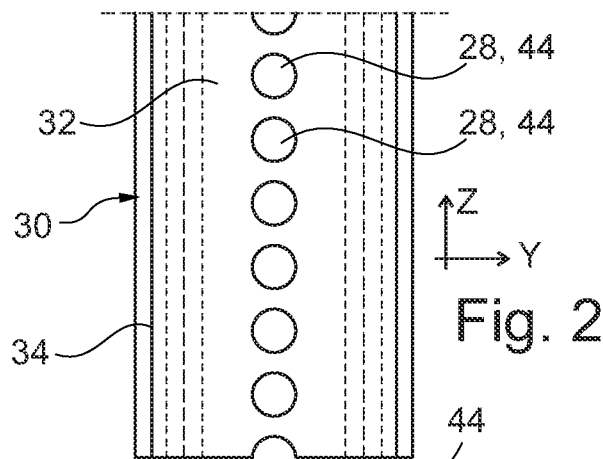
Figure 3:
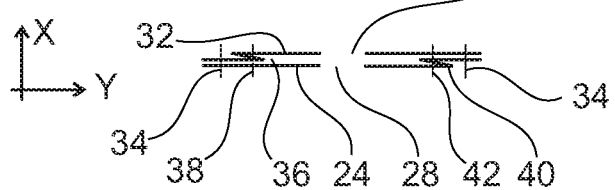
Figure 4:
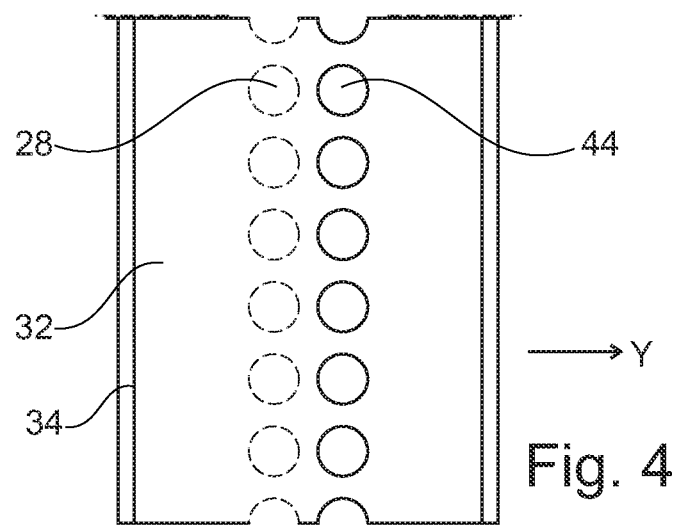
Figure 5:
Figure 6:
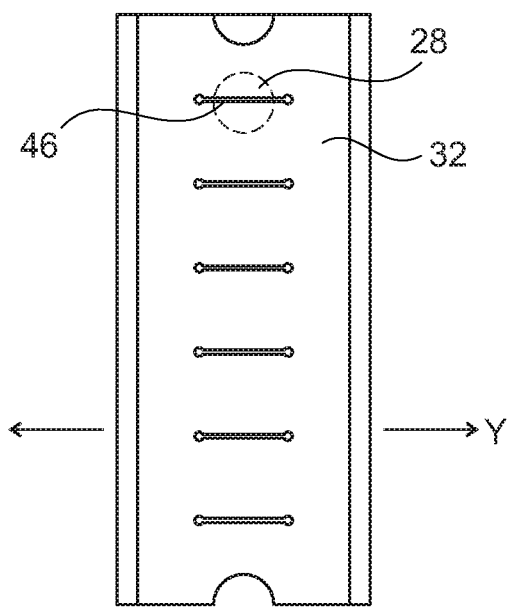
Figure 7:
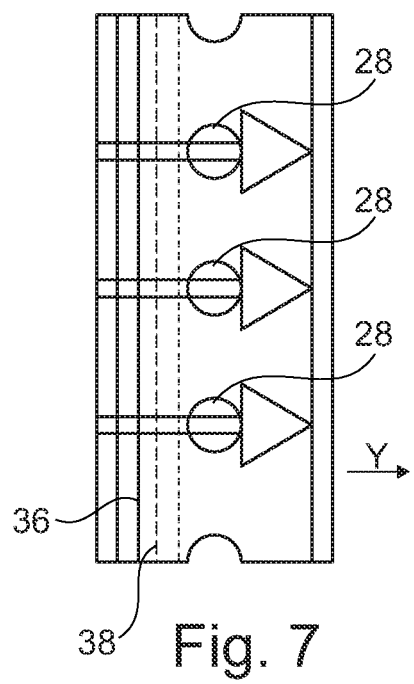
Figure 8:
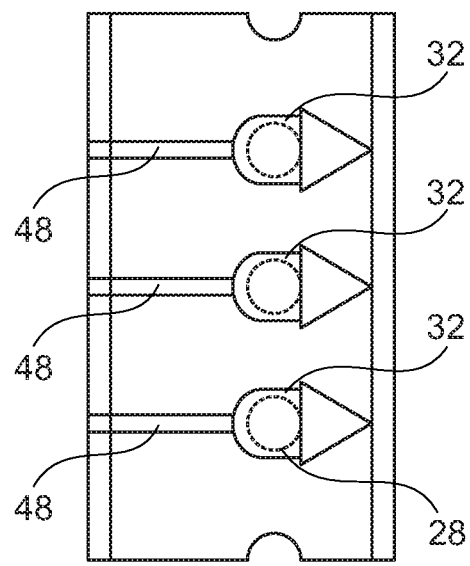
Figure 9:
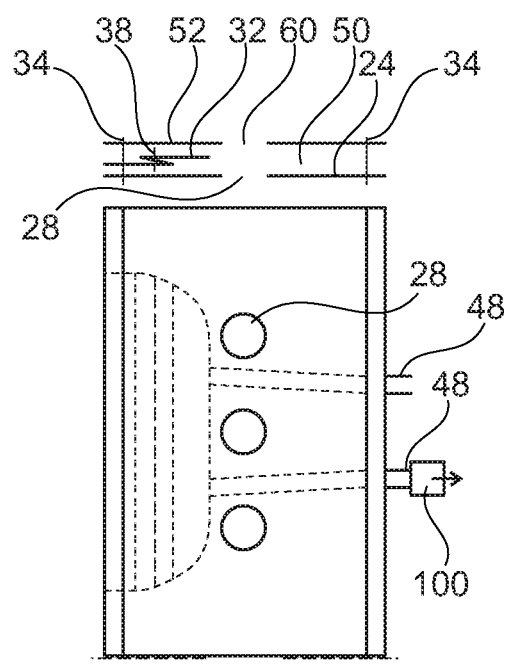
Figure 10:
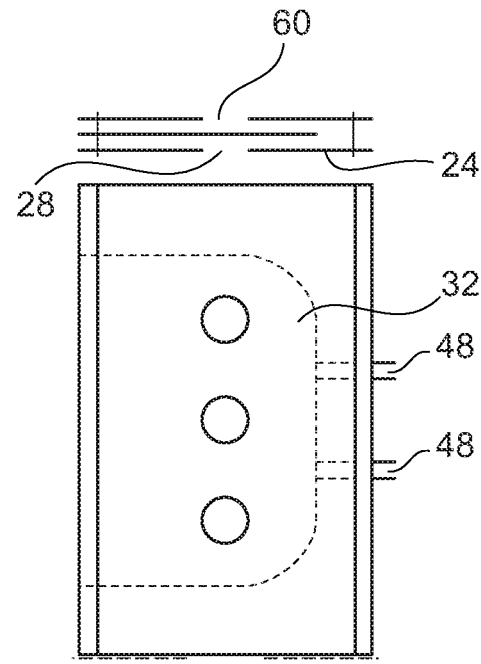
Figure 11:
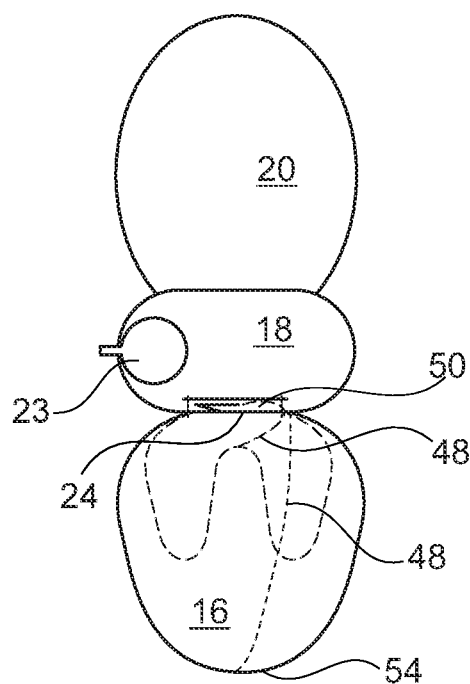
Figure 12:
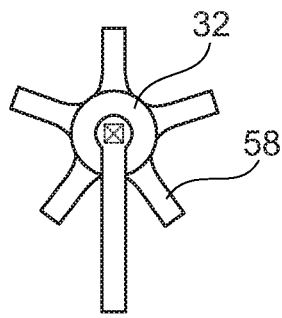
Figure 13:
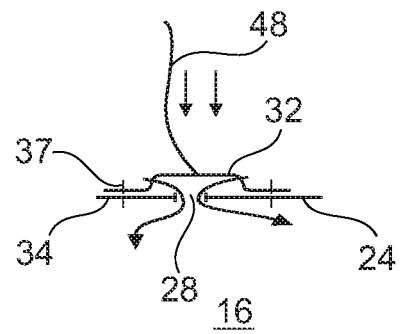
Figure 14:
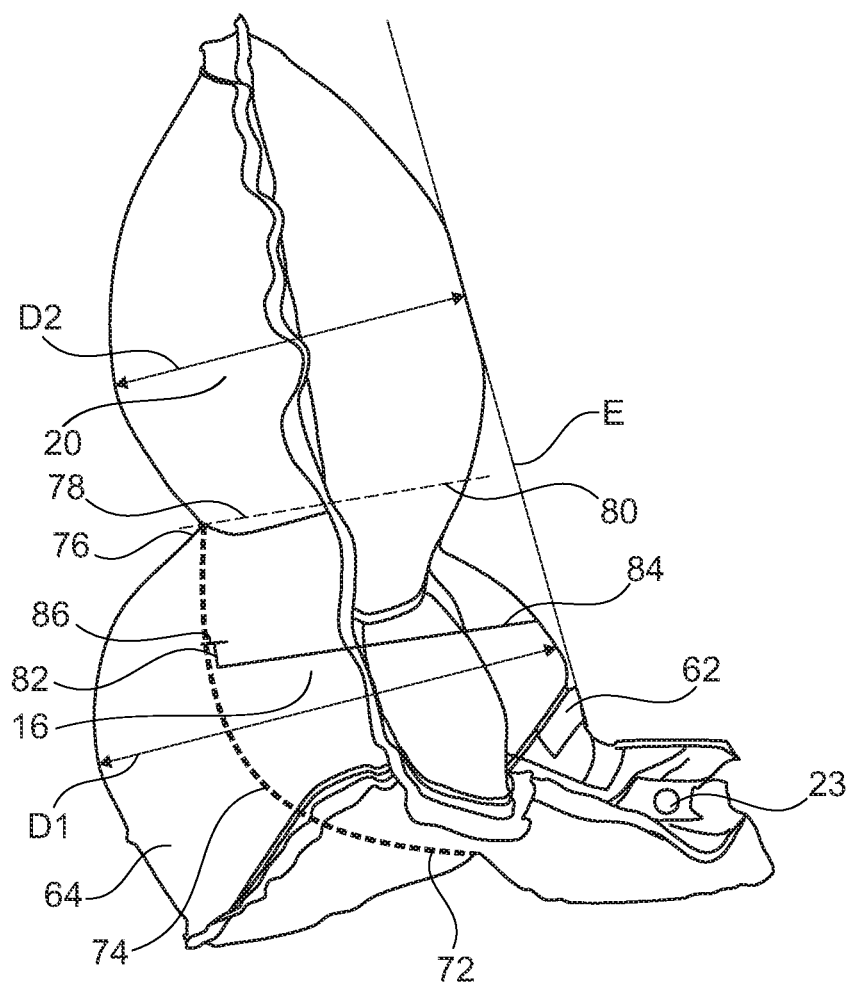
Figure 15:
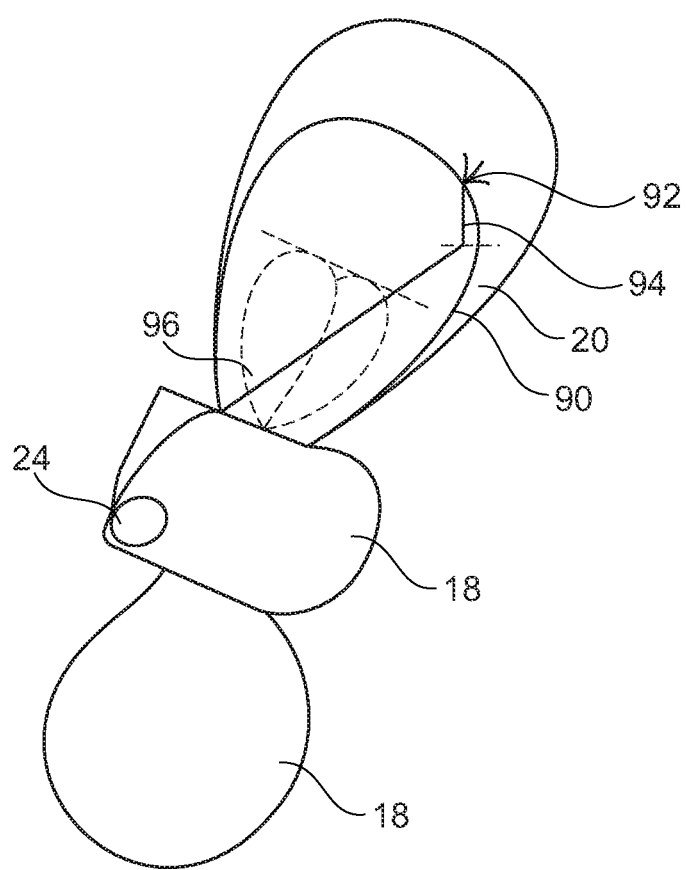

Further features and advantages of the invention will be evident from the following description of the subsequent drawings which are referred to, and wherein:

FIG. 1 shows a side view of a mid-mounted knee airbag module according to the invention in the inflated state, FIG. 2 shows a schematic top view onto a valve device in the opened state, FIG. 3 shows a side view of the valve device in the opened state according to FIG. 2, FIG. 4 shows a schematic top view onto the valve device according to FIG. 2 in the closed state, FIG. 5 shows a side view of the valve device according to FIG. 4 in the closed state, FIG. 6 shows a top view onto a valve device used in the knee airbag module according to the invention in accordance with another embodiment, FIG. 7 shows a top view onto another variant of the valve device in the opened state, FIG. 8 shows a top view onto the valve device according to FIG. 7 in the closed state, FIG. 9 shows a top view onto yet another variant of the valve device in the opened state, FIG. 10 shows a top view onto the valve device according to FIG. 9 in the closed state, FIG. 11 shows a schematic sectional view across the airbag used in the invention in two different deployment states, FIG. 12 shows a schematic top view onto another valve device, FIG. 13 shows a sectional view across the valve device according to FIG. 12, FIG. 14 shows a side view across a variant of the low-mounted knee airbag module according to the invention in the fully inflated state, and FIG. 15 is another mid-mounted knee airbag module in the fully inflated state.

FIG. 1 illustrates a mid-mounted knee airbag module 10 accommodated in an instrument panel 12, namely in the part of the instrument panel 12 extending diagonally upward next to the tibias.

An airbag 14 includes, for example, three elongate chambers superimposed in the vertical direction X, i.e., a lower chamber 16, a middle chamber 18 and an upper chamber 20, all of which are fluid-communicated with each other. A module housing 21 can receive a gas generator 23 which is directly fluid-coupled to the middle chamber 18 so that the middle chamber 18 is inflated first.

The lower chamber 16 prevents, in the inflated state, the legs and the tibias from moving upward and thus the legs in total from being straightened during the impact. Further, swaying of the lower extremities is at least reduced. In addition, slamming of the lower extremities into the instrument panel 12 and, resp., the upper limitation of the footwell can be prevented, or at least the intensity of the impact of the lower extremities onto the instrument panel 12 and, resp., the upper limitation of the footwell can be reduced.

Inside the airbag 14, the chambers 16-20 can be delimited from each other by partitions 22, 24, the partition 22 including numerous and relatively large overflow openings 26. The partition 24, too, includes numerous overflow openings 28 which are visible in FIG. 2 and in FIG. 3. The alignment of the overflow openings 28 is side by side, for example, and, when viewed from the occupant, extends horizontally along a direction Z protruding into the drawing in FIG. 1, i.e., the direction X shown in FIG. 1 extends vertically in FIG. 3.

A valve device 30 is configured to close the overflow openings 28 from reaching a predetermined deployment state, i.e., during deployment.

The valve device 30 comprises a flexible wall 32 constituting a closing means. The flexible wall 32 is stitched to the partition 24 on the side of the middle chamber 18, as shown in FIG. 3. The corresponding seams bear the reference numeral 34 and are configured so that they do not tear during the entire deployment operation.

In addition, the flexible wall 32 is folded in parallel to the longitudinal direction of the alignment of the overflow openings 28. The corresponding folding is evident from FIG. 3 and bears the reference numeral 36. Said folding is temporarily fixed by a tear seam 38.

In the overlapping region of the partition 24 and the flexible wall 32, the partition 24 is equally folded, said folding 40 extends preferably in parallel to the folding 36 and is fixed in this region by a further tear seam 42 so that also the folding 40 is maintained over a period during deployment of the airbag 14.

The flexible wall 32 includes openings 44 being aligned, in the initial state, with the overflow openings 28 so that, in the initial state, the overflow openings 28 are exposed.

After deploying the airbag 14, gas flows into the middle chamber 18 and via the relatively large overflow openings 26 into the upper chamber 20 as well as via the overflow openings 28 into the lower chamber 16.

As soon as a particular deployment state of the airbag 14 is achieved, such a great force is exerted in the direction Y on the tear seams 38, 42 that the tear seams 38, 42 are destroyed and the folds 36, 40 are opened. By displacing the flexible wall 32 relative to the partition 24, the openings 44 are displaced toward the overflow openings 28 so that they are covered, as shown in FIGS. 4 and 5.

Thus, the chamber 16 is not filled with the pressure that would be present in the case of permanently open overflow openings 28. This means that the lower chamber 16 has a lower maximum pressure than the remaining chambers 18, 20, preferably by at least 40%.

In the embodiment according to FIG. 6, the flexible wall 32 is provided with elongate slits 46 located in the region of the overflow openings 28 of the partition 24. As long as sufficient tension is not exerted on the flexible wall 32 in the direction Y, the slits 46 may gape open so that the overflow openings 28 are exposed. If, however, from reaching a particular deployment state, sufficient tensile force is applied by the outwardly urging outer wall of the airbag 14 in the direction Y, the slits 46 remain at least substantially closed so that no gas or only very little gas can flow into the lower chamber 16.

The embodiments according to FIGS. 7 and 8 illustrate a separate closing means in the form of a flexible wall 32 for each overflow opening 28 in the partition 24, wherein the flexible wall 32 is displaced by tension means in the form of tethers 48 over the assigned overflow openings 28 when, starting from a particular deployment state, a displacing force is applied in the direction Y. The flexible walls 32 may be displaced in pockets between two textile layers one of which constitutes the partition 24.

In order to ensure that the valve device is not closed before a predetermined force and a predetermined deployment state are reached, there is provided a tear seam 38 which maintains and positions a folding 36 in the partition 24 and, if present, in the flexible wall placed above the latter in the initial state.

FIG. 7 illustrates the initial state with opened overflow openings 28 and an intact tear seam 38, and FIG. 8 illustrates the closed overflow openings 28 after the tear seam 38 has been destroyed and the relative displacement between the overflow openings 28 and the flexible walls 32 has taken place which is mainly ensured also by the tethers 48 which are fastened to their left end shown in FIGS. 7 and 8 outside the region of the folding 36, i.e., more precisely to the left of the folding 36.

In the embodiment according to FIGS. 9 and 10 which also includes the embodiment according to FIG. 11, like or equally functioning parts or portions are provided with the already illustrated and introduced reference numerals so that they need no longer be discussed separately. On the partition 24 a pocket 50 with a corresponding chamber is formed by the fact that another flexible wall 52 is stitched onto the partition 24, see the seams 34. In the pocket 50, the closing means is accommodated in the form of a folded flexible wall 32 the folding of which is secured by a tear seam 38. In the present case, however, only the flexible wall 32 is folded, and the tear seam 38 extends through the flexible wall 32 only.

The flexible wall 32 takes the shape of a tongue tightly connected to the partition 24 at one end via the seam 34. At the opposite end of the tongue, tethers or at least one tether 48 extending through interruptions in the seam 34 are/is provided.

FIG. 11 illustrates that the tether 48 extends out of the pocket 50 and is fastened to the bottom 54 of the chamber 16 on the outer wall of the airbag 14.

The tether 48 has an excess length so that initially it is not tension-loaded, when the airbag is not yet largely deployed, as can be seen from the state of the partially inflated chamber 16 shown in FIG. 11 by broken lines. Only from a particular deployment state is the tether 48 subjected to tensile loading and moves the flexible wall 32, viz. the tongue, inside the pocket 50 in front of the overflow openings 28 which have correspondingly aligned outlet openings 60 in the wall 52. This is illustrated in FIG. 10. The tension force exerted by the tethers 48 also causes the tear seam 38 to be destroyed.

A star-shaped closing means, equally in the form of a flexible wall 32, is shown in FIGS. 12 and 13. The points 58 of the star are fastened at their free outer ends to the partition 24 by seams 37. A tether 48 extends, for example, through the middle chamber 18 to a tear seam or, alternatively, to an actuator.

At the beginning of the deployment operation, gas can flow, as shown in FIG. 13 by means of the arrows, through the overflow opening 28 and between the points 58 into the lower chamber 16. From reaching a predetermined deployment state, tension is exerted via the tether 48 on the tear seam by which the tether 48 is fastened to a wall of the chamber 18, for example, said tension destroying the tear seam and resulting in the release of the tether 48. The release of the tether 48 prevents any more tension from being exerted on the flexible wall 32, and the pressure prevailing in the middle chamber 18 presses the flexible wall 32 and, thus, the center of the closing means against the partition 24, thereby closing the overflow opening 28. Alternatively, the tether 48 can be actively controlled to be released by the actuator.

Instead of the valve devices passively actuated in the preceding embodiments, the valve device can be moved by an electrically operable pyrotechnical actuator 100 symbolically shown in FIG. 9. In all other embodiments, too, such actuator may be employed.

FIG. 14 illustrates a low-mounted module that is disposed, in the mounted state, in front of the instrument panel, i.e., in the region of an upper delimitation of the footwell. In the shown embodiment, the airbag 14 has a lower chamber 16 and an upper chamber 20 extending in the direction further toward the vehicle tail, the chambers being fluid-communicated with each other. In the inflated state, they also extend vertically, when viewed from the occupant, and are on top of each other, i.e., the upper chamber 20 is closer to the upper body than the lower chamber 16.

Inflation takes place from the lower end 62 of the lower chamber 16, wherein an additional chamber 64 resting on and being filled via the lower chamber 16 is provided between the lower chamber 16 and the legs of the occupant.

Between the lower chamber 16 and the additional chamber 64, a partition 72 having overflow openings 74 is provided. In the shown embodiment, the thickness D1 of the airbag 14 in the region of the additional chamber 64 is larger than the maximum thickness D2 of the upper chamber 18, wherein the thickness D1 and the thickness D2 are measured in parallel to each other, namely perpendicularly to a fictitious support plane E with which the rear side of the inflated airbag 14 would fictitiously rest. Thus, the shown airbag is L-shaped in a side view.

Between the lower chamber 16 and the upper chamber 20, optionally there may not only be provided the constriction 76 but also a partition 78 having openings 80 through which gas can flow.

The partition 72 and the relatively small overflow openings 74 prevent the internal pressure of the additional chamber 64 from reaching the internal pressure of the lower chamber 16 during the entire inflation operation and, in one embodiment, said internal pressure is at least 30% below the maximum internal pressure of the lower chamber 16.

In this case, too, a valve device may be provided similarly to that of the afore-described examples. In contrast to the preceding embodiments, in this case the overflow openings 74 are initially closed, however, by the valve device such as a flexible wall 82 and are opened in the course of the deployment operation. For this purpose, one or more tethers 84 may be provided, for example. The flexible wall 82 is fastened to the partition 72 for example by a permanent seam 86.

The additional chamber 64 can be filled later by said valve device, in one embodiment not earlier than 20 ms to 40 ms after triggering the gas generator 23, for example.

This additional chamber 64 helps reduce a swaying movement and avoid overstretching of the knee. Due to the slow deployment of the additional chamber 64, the additional chamber becomes less aggressive together with the lower chamber 16.

The variant according to claim 15 illustrates a mid-mounted module having a lower chamber 16, a middle chamber 18 through which inflation takes place and an upper chamber 20. In the upper chamber 20 an inner airbag 90 including one or more outlet openings 92 is provided. Said outlet openings 92 are operated via a valve device 94, for example via a tether 96 which opens the valve device from a particular deployment state and allows gas to flow from the inner airbag 90 into the upper chamber 20 so that the volume in the upper region is increased; for, in the case of restraint, the volume of the chamber 20 and of the inner airbag 90 are available. In this case, too, overflow into the chamber 20 occurs with a delay, because the peeling of the valve device 94 from the outlet openings 94 will not begin before a predetermined deployment state of the inner airbag 90.

The invention claimed is:

1. A knee airbag module, comprising a knee airbag configured to inflate and deploy in front of a seated occupant between lower legs of the seated occupant and vehicle structure to which the knee airbag module is attached, the knee airbag comprising plural vertically arranged chambers that extend widthwise in the vehicle and are superimposed in the inflated state, including a middle, upper and lower chamber, wherein the middle chamber is directly coupled to the gas generator and is inflated first, wherein the lower chamber is fluid-communicated with the middle chamber via plural overflow openings and a valve device is configured at the overflow openings so that the overflow openings are open at the beginning of the deployment operation and the valve device closes the overflow openings in the course of the deployment operation.

2. The knee airbag module according to claim 1, wherein the valve device is configured to close the overflow openings between 20 ms and 40 ms after ignition of the gas generator.

3. The knee airbag module according to claim 1, wherein the valve device is a passive device.

4. The knee airbag module according to claim 1, wherein the valve device is coupled to an actuator which operates the valve device in response to a signal and changes the opening state of the overflow openings.

5. The knee airbag module according to claim 1, wherein the valve device includes a tension element moving a closing element over the overflow openings from reaching a predetermined deployment state to close said overflow openings.

6. The knee airbag module according to claim 1, wherein a closing element for the overflow openings is formed by at least one flexible wall which is disposed at a partition between the middle chamber and the lower chamber and is released by the tension element prior to fixation.

7. The knee airbag module according to claim 5, wherein the flexible wall is assigned to plural overflow openings to close the latter.

8. The knee airbag module according to claim 5, wherein the valve device comprises a flexible wall and, in an initial state, the flexible wall and/or the partition are folded between the middle chamber and the lower chamber in an overlapping region of the flexible wall and the partition, in particular wherein the folding is fixed by a tear seam and the folding is opened from reaching a predetermined inflation state to close the overflow openings.

9. A knee airbag module, comprising a knee airbag configured to inflate and deploy in front of a seated occupant between lower legs of the seated occupant and vehicle structure to which the knee airbag module is attached, the knee airbag comprising plural vertically arranged chambers that extend widthwise in the vehicle and are superimposed in the inflated state, including a lower chamber and an upper chamber, wherein the lower chamber is directly coupled to the gas generator and is inflated first, wherein an additional chamber extends widthwise in the vehicle, rests on the lower chamber, is filled via the lower chamber, and is positioned between the lower chamber and the lower legs so that the additional chamber receives the lower legs, wherein overflow openings decelerating the filling of the additional chamber are provided between the lower chamber and the additional chamber, wherein the thickness of the knee airbag in the region of the additional chamber is larger than the maximum thickness of the upper chamber.

10. The knee airbag module according to claim 9, wherein the overflow openings are configured to be so small that the additional chamber does not reach the internal pressure of the lower chamber.

11. The knee airbag module according to claim 10, wherein the maximum internal pressure of the additional chamber is at least 30% below the maximum internal pressure of the lower chamber during the inflation operation.

12. The knee airbag module according to claim 9, wherein there is provided a valve device configured so that it closes the overflow openings at the beginning of the deployment operation and opens them in the course of the deployment operation.

13. The knee airbag module according to claim 1, wherein the valve device is configured so that at least one of the upper, middle, and lower chamber is not inflated as fully as the remaining chambers so that a pressure difference is achieved between the chambers.

14. The knee airbag module according to claim 1, wherein the valve device is configured so that the lower chamber is not inflated as fully as the middle or upper chambers so that a pressure difference is achieved between the chambers.

15. The knee airbag module according to claim 9, wherein the additional chamber is configured to be positioned between the occupant's feet and the lower chamber.

16. The knee airbag module according to claim 1, wherein the airbag is configured to be positioned between an instrument panel of the vehicle and the seated occupant and to extend widthwise across a footwell of the vehicle.

17. The knee airbag module according to claim 9, wherein the knee airbag is configured to be positioned between an instrument panel of the vehicle and the seated occupant and to extend widthwise across a footwell of the vehicle.

18. The knee airbag module according to claim 9, wherein the thickness of the knee airbag in the region of the additional chamber is at least 20% above the maximum thickness of the upper chamber.

* * * * *